United States Patent [19]

Steinlicht

[11] Patent Number: 5,335,269
[45] Date of Patent: Aug. 2, 1994

[54] TWO DIMENSIONAL ROUTING APPARATUS IN AN AUTOMATIC CALL DIRECTOR-TYPE SYSTEM

[75] Inventor: Joseph C. Steinlicht, Glen Ellyn, Ill.

[73] Assignee: Rockwell International Corporation, El Segundo, Calif.

[21] Appl. No.: 850,110

[22] Filed: Mar. 12, 1992

[51] Int. Cl.⁵ .......................... H04M 3/00; H04M 3/42
[52] U.S. Cl. .................................. 379/266; 379/265; 379/309
[58] Field of Search ............... 379/265, 266, 309, 210, 379/211, 213

[56] References Cited

U.S. PATENT DOCUMENTS

| | | | |
|---|---|---|---|
| 4,048,452 | 9/1977 | Oehring et al. | 379/266 X |
| 4,757,529 | 7/1988 | Glapa et al. | 379/266 X |
| 4,881,261 | 11/1989 | Oliphant et al. | 379/266 X |
| 4,951,310 | 8/1990 | Honda et al. | 379/266 |
| 5,025,468 | 6/1991 | Sikand et al. | 379/309 X |
| 5,206,903 | 4/1993 | Kohler et al. | 379/309 |

OTHER PUBLICATIONS

"The Smart Way to Sell Paradise", Cameron Ives, Inbound/Outbound Magazine Aug. 1989 pp. 20-24.

*Primary Examiner*—James L. Dwyer
*Assistant Examiner*—Daniel S. Hunter
*Attorney, Agent, or Firm*—C. B. Patti; H. F. Hamann

[57] ABSTRACT

In an automatic call director-type system, it is often more desirable to direct an incoming call to an immediately available agent who has less than perfect knowledge of the subject matter rather than forcing a caller to wait for the best qualified agent. The present invention relates to an algorithm implemented in computer software for placing an incoming call in a plurality of queues and then offering the call to primary and secondary desirability agents in each of the queues in a prescribed order if any one of these groups of agents has an agent standing by and able to accept a call. Otherwise, the call is offered to the next available agent regardless of the capability of that agent. The concept includes the capability of expanding the pool of potential agents in the queue with age of a call when the incremental expansion pool of agents selected can be based on their backlog of calls for other applications where they may have primary responsibility.

3 Claims, 8 Drawing Sheets

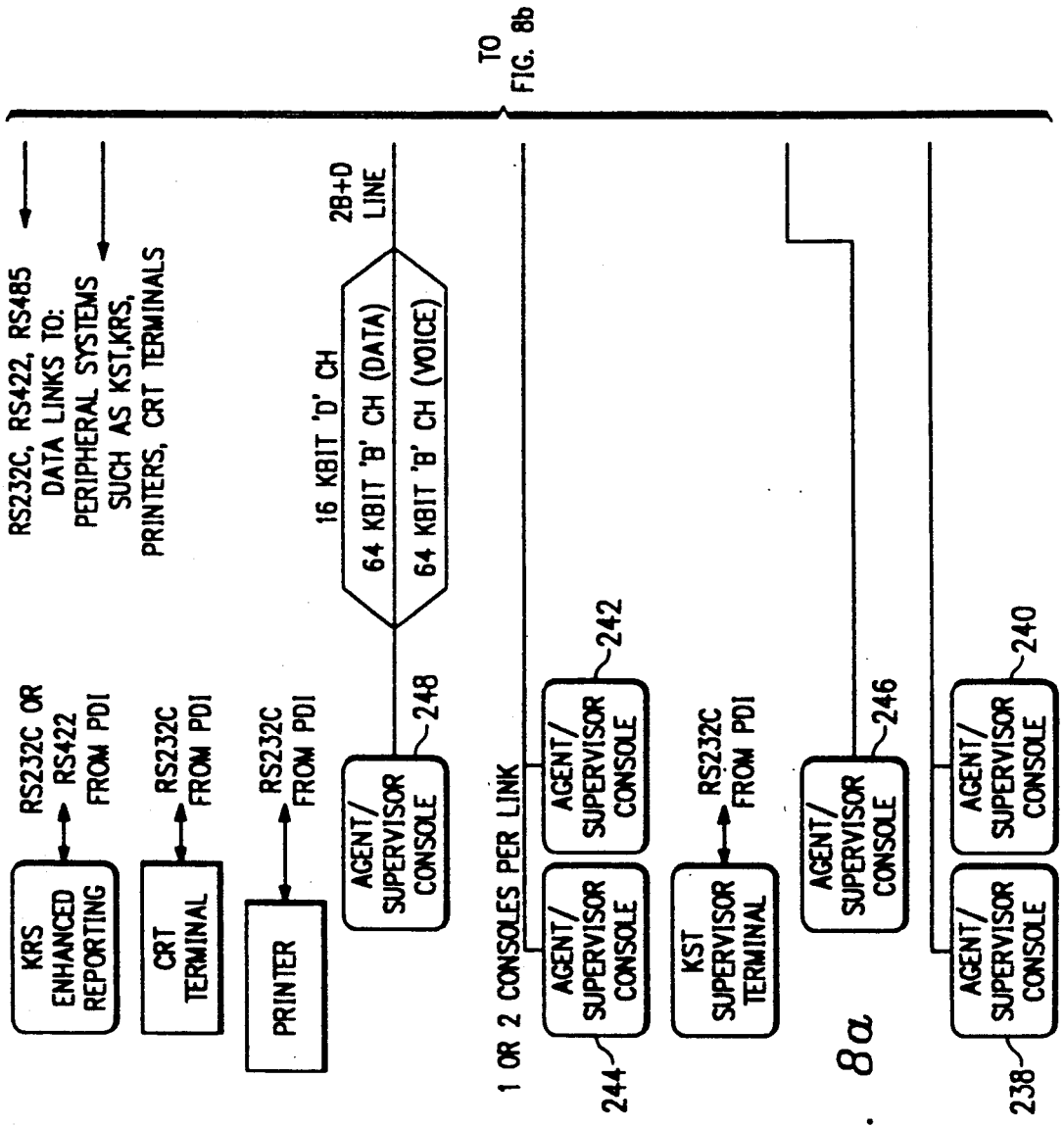

TWO DIMENSIONAL ROUTING APPARATUS IN AN AUTOMATIC CALL DIRECTOR-TYPE SYSTEM

THE INVENTION

The present invention is generally related to electronics and more specifically related to automatic call directing switch systems. Even more specifically, the invention is directed to a more efficient way of completing an incoming call to an agent by using two different dimensions of routing.

BACKGROUND

Typically in the prior art, a call arriving at an automatic call directing switch are placed in a queue and given to the next agent available. A single dimension modification of this approach was to search first through the most qualified group of agents and then check a secondary group who is actually more qualified on another subject but has enough capability to handle the particular subject matter involved and have that subject matter as their secondary responsibility. In other words, a primary call queue first checks the primary responsibility agents of a given agent group and then a secondary call queue checks the secondary responsibility agents for that agent group.

A second single dimension approach taken by the prior art to reduce the waiting time in case the primary responsibility agents are all busy is to place an incoming call in two different agent group queues. There is a primary agent group queue and a secondary agent group queue. Each of the queues mentioned are part of a single agent group. The system then checks for a free agent in the first queue and then for a free agent in the second queue until an available agent is found.

While both of the one dimensional approaches to reducing the waiting time during busy periods provide benefits over the original approach, more improvement was needed. The present invention allows not only adding additional queues of agents up to a maximum of four but allows each queue to search first a primary group or set of agents and then a secondary responsibility group or set of agents. This effects a two dimensional expansion of the available number of agents for answering calls to reduce the waiting time over what would occur in the prior art approaches.

It is therefore an object of the present invention to minimize the waiting time for an incoming call to be connected to an agent by taking actions to connect the call to less qualified agents where necessary rather than wait for the availability of only a highly qualified agent.

Other objects and advantages of the present invention will be apparent from a reading of the specification and appended claims in conjunction with the drawings wherein:

Figure 5:
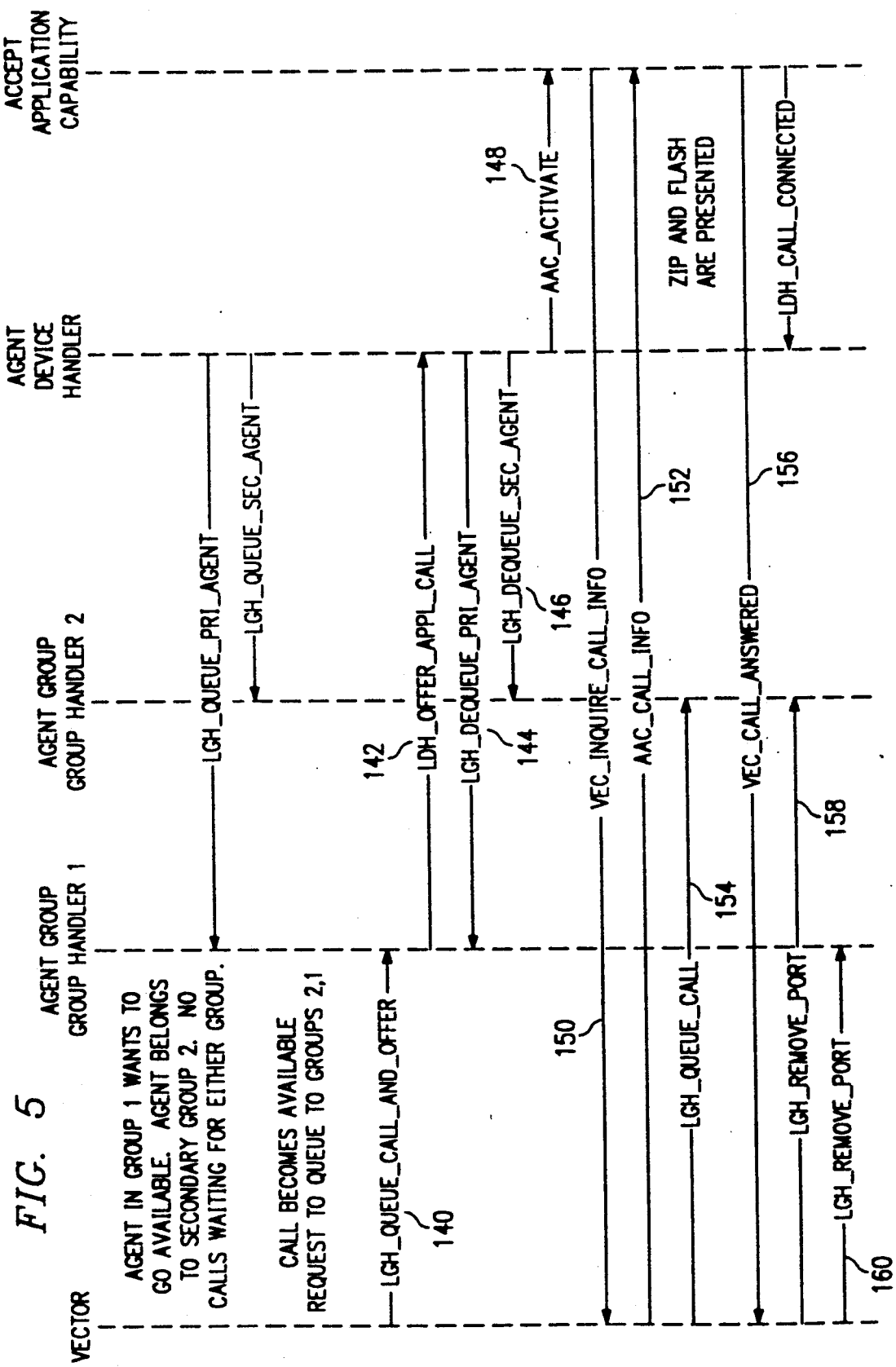
FIG. 5 is a bounce diagram for use in explaining a portion of the operation of FIGS. 3 and 4.
Figure 6:
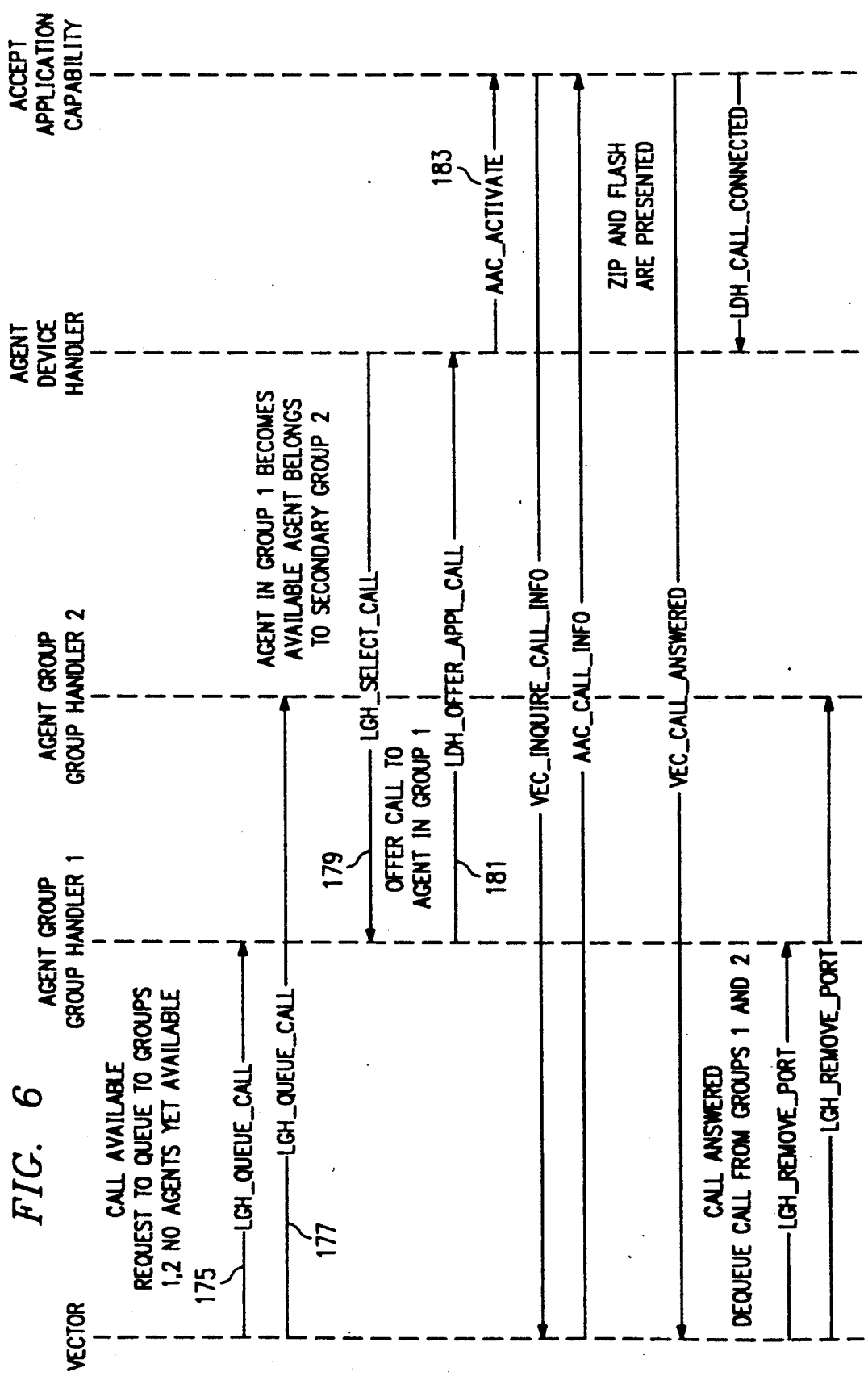
Figure 7:
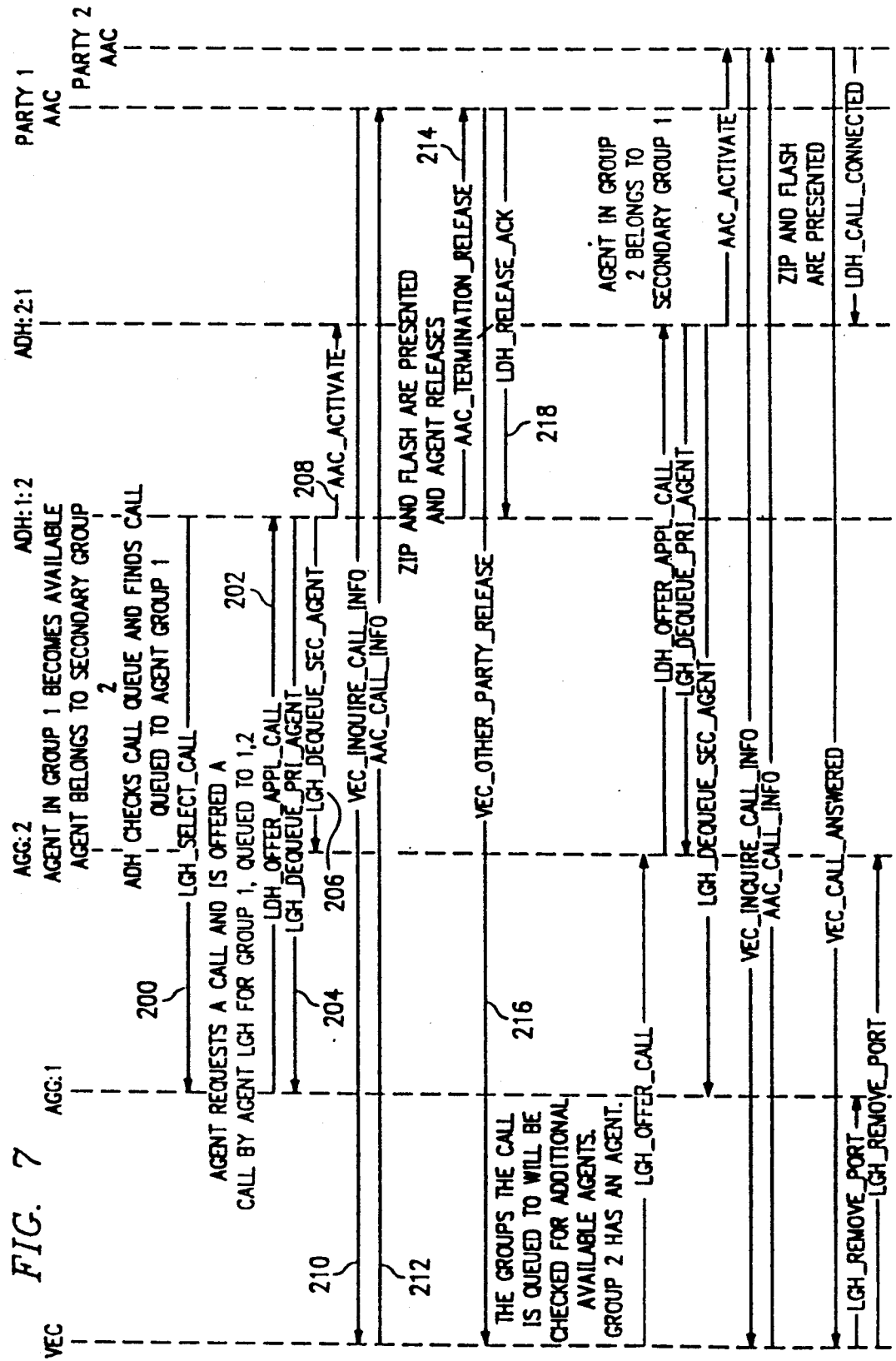
Figure 8B:
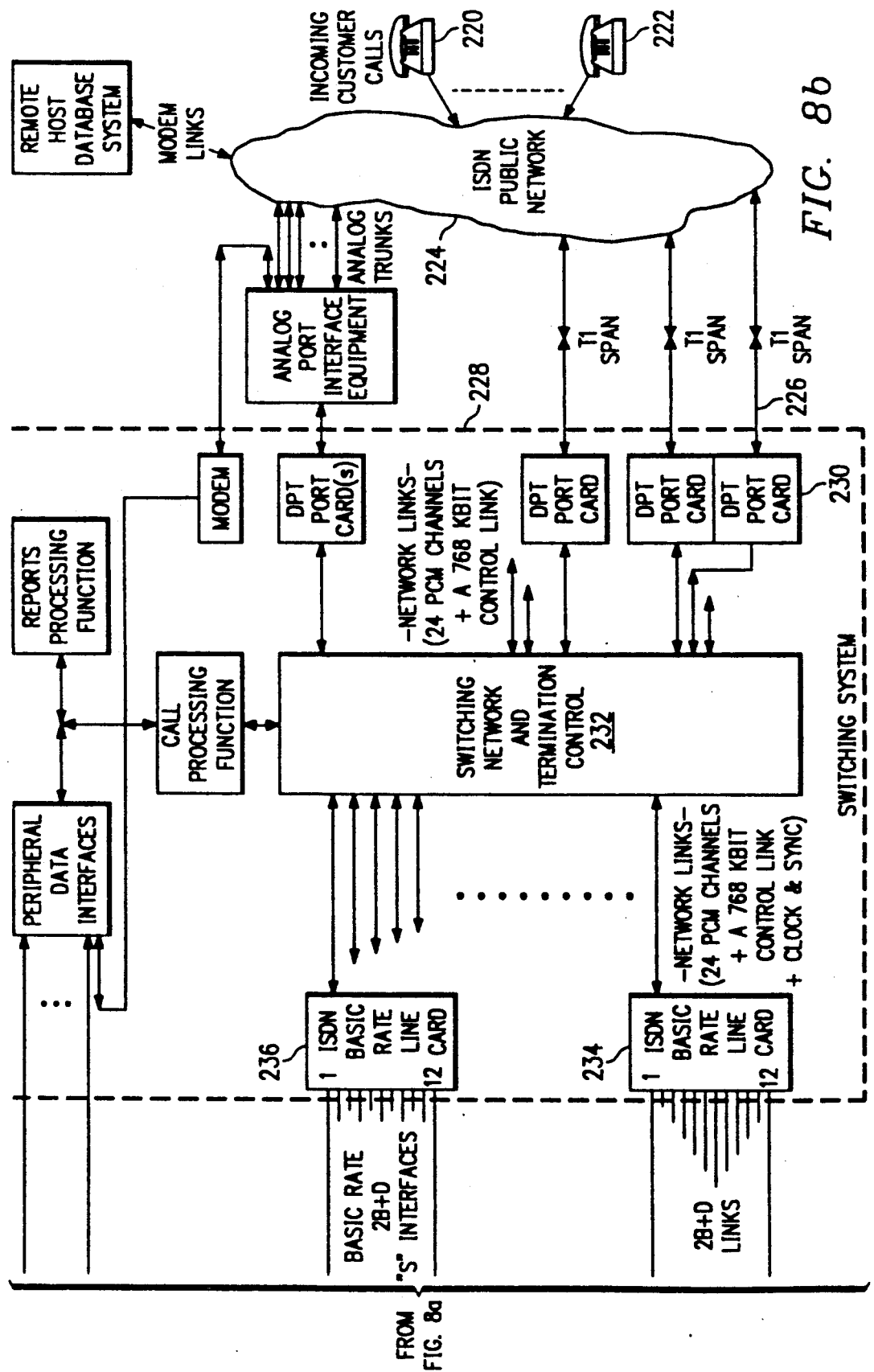

FIG. 6 comprises a bounce diagram for use in explaining an alternate scenario to that explained in the bounce diagram of FIG. 5;

FIG. 7 is a bounce diagram explaining a further alternate scenario from that of FIGS. 5 and 6;

FIGS. 8A and 8B illustrate a block diagram of an overall system incorporating the present inventive concept; and FIG. 9 comprises a listing of a vector or subroutine utilized in the system to accomplish expansion of number of agent groups that could be involved to accomplish a connection when there is a heavy load for a particular application or call type.

DETAILED DESCRIPTION

Figure 1:
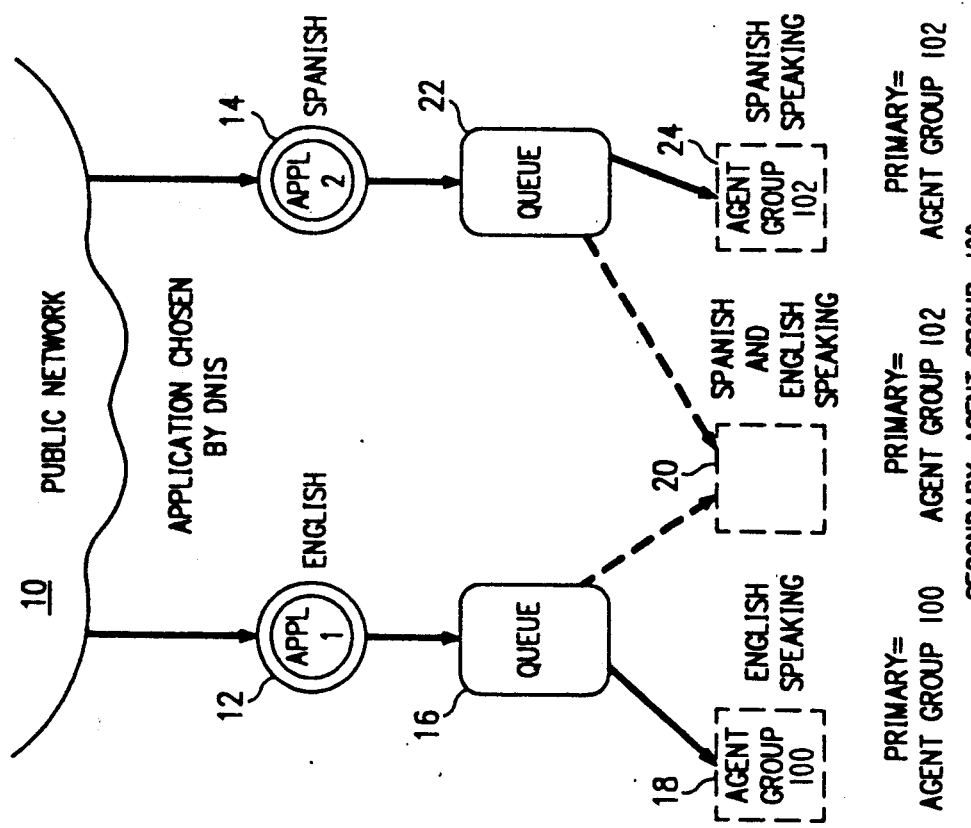
FIG. 1 is a broad flow diagram of the manner in which an incoming call is connected to an agent according to one prior art approach of agents having multiple group assignments.

In FIG. 1 a public network is labeled generally as 10 and it supplies incoming calls from various callers such that a given telephone number may represent English calls and arrive to application 1 designated as 12 and a second telephone number may represent Spanish calls which would be supplied to a circle labeled as application 2 and numerically designated as 14. The system would place the English calls in a queue 16 which, in accordance with programming of the system, would first look to a group of agents labeled as 18 and if none were found to be available at that moment would check to see whether or not any agents were available in a group of agents designated as 20. As shown, the group 18 comprises only English speaking agents. Group 20, on the other hand, is used as a secondary source of agents for both the English incoming calls on to 12 and the Spanish incoming calls to 14. As shown, the Spanish calls go to a queue 22 which primarily would to to an agent group listed as 24 which comprises only Spanish speaking agents and if all the Spanish speaking agents are busy, it would attempt to find an available agent in group 20.

Figure 2:
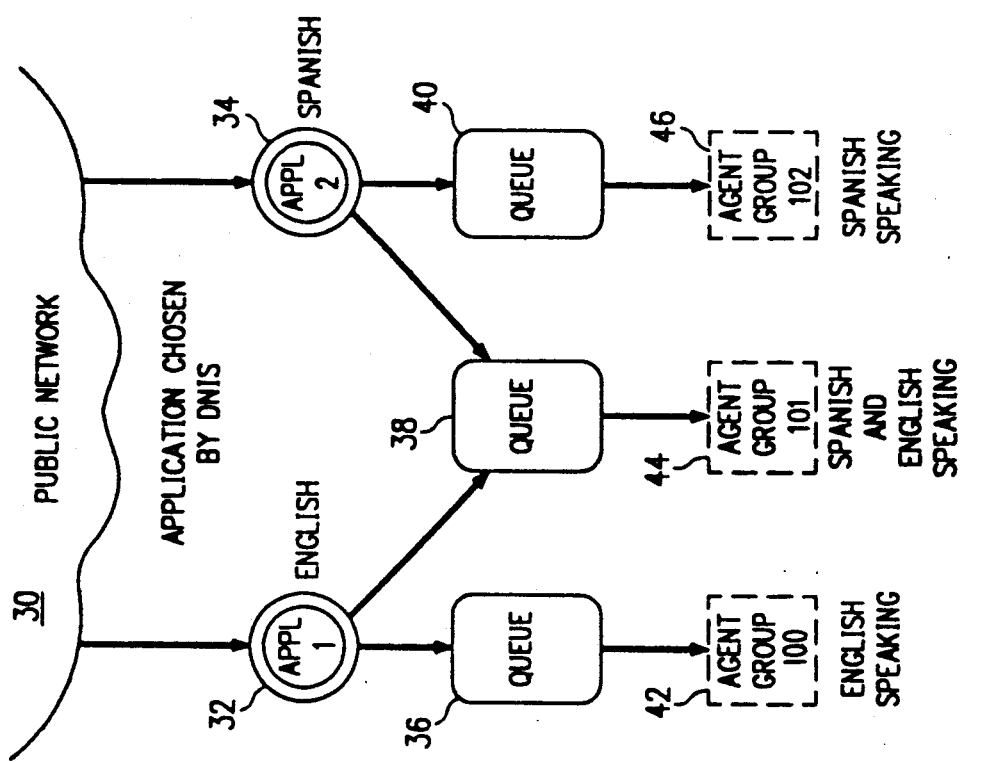
FIG. 2 is a broad flow diagram of a second prior art approach of connecting incoming calls to an agent in one of multiple groups being offered a call.

In FIG. 2 a public network 30 similar to that of FIG. 1 supplies signals to an application 1 designated as 32 and on a different phone number to an application 2 designated as 34. As illustrated, application 1 is for English sales, and application 2 is for Spanish sales. Application 1 supplies calls first to a single agent group queue 36 and if queue 36 results in no agents being found, checks on a single agent group queue 38. Application 2 first checks on a single agent group queue 40 and then checks on queue 38. An agent group 100 and designated as 42 is connected to queue 36. An agent group 101 and designated as 44 is connected to queue 38 while an agent group 102 and further designated as 46 is connected to queue 40. As shown in the figure, group 42 is English speaking, group 46 is Spanish speaking and group 44 is both English and Spanish speaking. While FIG. 1 illustrated agents with multiple group assignments, or in other words, group 20 had its primary responsibility for the Spanish applications and secondary responsibility for English, FIG. 2 shows an incoming call presented to multiple agent groups in the form of separate queues.

Figure 3:
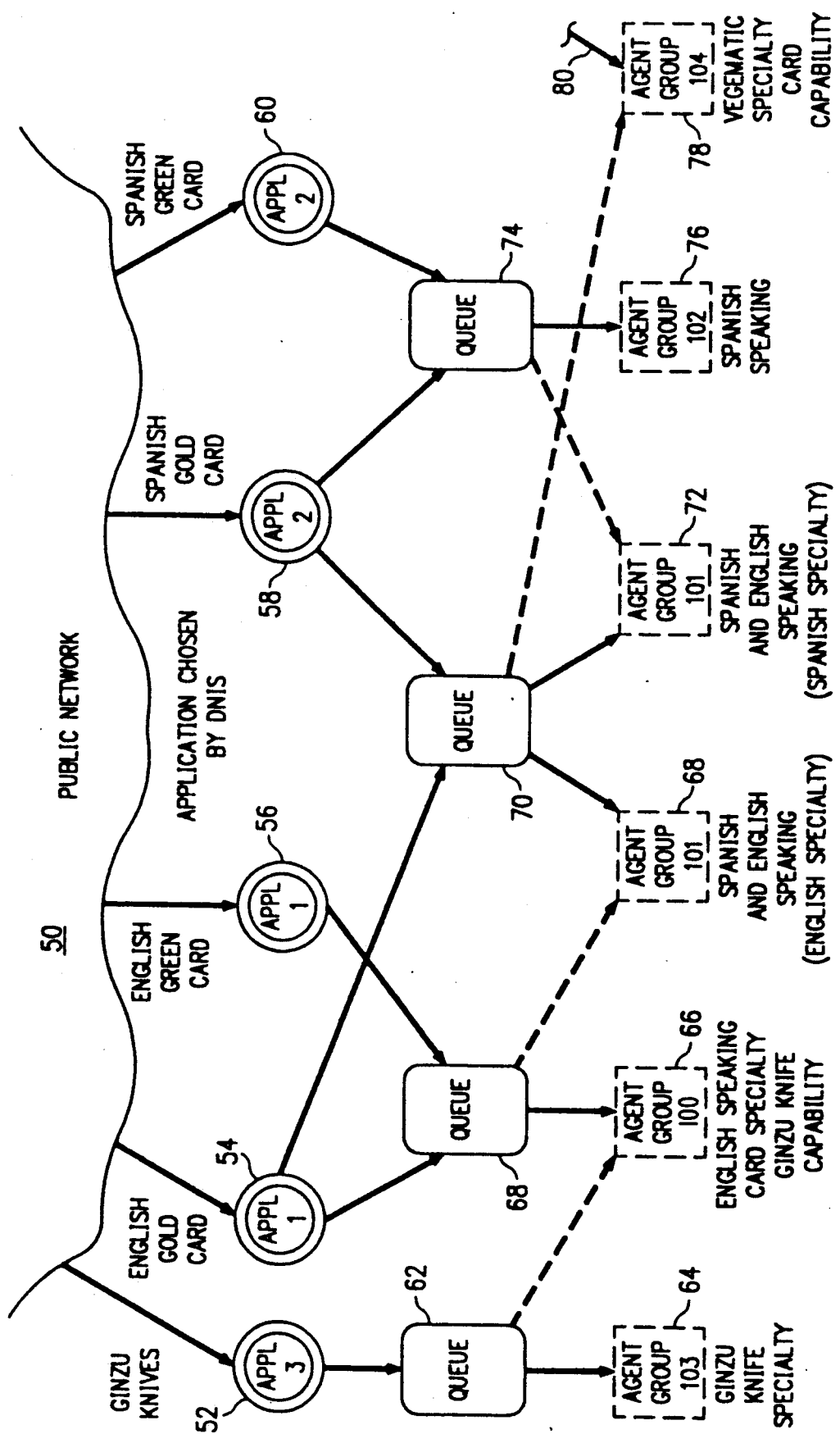
FIG. 3 is a flow diagram of the manner in which calls are connected to agents according to the present inventive concept.

In FIG. 3 a public network 50 is shown with five different phone numbers being used to access various application circles. These circles are designated as 52, 54, 56, 58 and 60. For the purposes of discussing the example, application 52 is for Ginzu knives, application 54 is for the English gold card, application 56 is for the English green card which would not be as important as the gold card, application 58 is for the Spanish gold card, and application 60 is for the Spanish green card which again would not be as important or require the level of service of the gold card. Application 52 is connected to a queue 62 which is connected to an agent group 64 having Ginzu knives as their specialty. It is also connected to an agent group 66 which has English speaking cards as their specialty but Ginzu knife capability as a secondary responsibility. Application 54 is connected to a queue 68 as well as to a queue 70. Queue 68 is connected to group 66 as well as to a group 68 which has English and Spanish speaking with English speaking as its specialty. Queue 70 is connected not only to agent group 68 but also to an agent group 72 which has Spanish and English speaking agents with Spanish as their specialty. Application 58 is connected to both queue 70 and to a queue 74. Queue 74 is connected to an agent group which has Spanish speaking agents only, and this group is designated as 76. An agent group designated as 78 is connected as a further group to queue 70, and group 78 has vegematic as its specialty and card capability as a secondary capability. Group 78 has a primary input from a further application not shown but the input is designated as 80.

Figure 4:
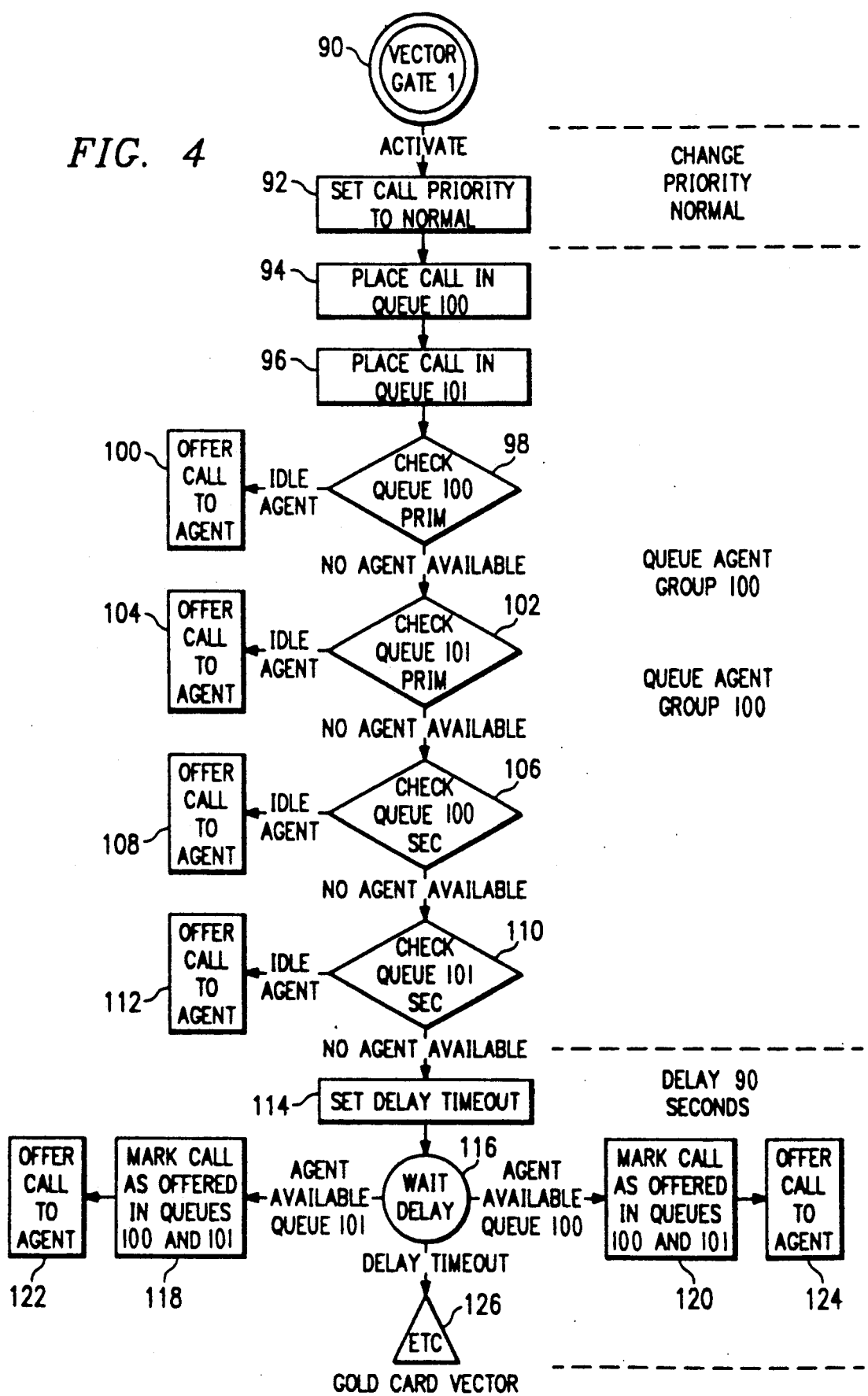
FIG. 4 is a different type of flow diagram for use in explaining the process presented in FIG. 3.

FIG. 4 illustrates a flow of steps that might occur in the system as a result of the system capabilities and a vector program written to provide a specific sequence of events as shown. In FIG. 4 a vector gate generally designated as 90 represents an incoming call for a given application. Vector gate 90 activates a set call priority to normal routine in a block 92 which then places a call in a queue 100 in a block 94. This might be the same as queue 68 in FIG. 3. The vector then places a call in queue 101 designated as 96 which could be the same as queue 70 in FIG. 3. The program, after placing the call in the queues for two different agent groups would then, as part of a decision block 98, check the queue in agent group 100 or block 66 of FIG. 3 and if it finds an idle and available agent in that group of agents, would offer a call to the idle agent as part of a decision block 100. However, if there were no agent available whose primary responsibility was that particular product, it would go on to a decision block 102. In block 102 it would check the agent group 101 for primary responsibility for that product and if it finds an idle agent, would offer a call to one or more of those agents found via a block 104. Again, if no agents were found yet, it would proceed to decision block 106 and check those agents who have secondary responsibility for the call. If an agent is found to be idle in that secondary responsibility, a call is offered to that agent in block 108. As illustrated in FIG. 3, block 68 is a group of agents who have secondary responsibility to calls from application 1 of block 56, although as shown, they have both primary and secondary responsibility for calls from block 54. Again, if no agents whose secondary responsibility in queue 100 as defined in decision block 106 are found, the program will proceed to a further decision block 110 and check to see if there are any secondary responsibility agents who are idle and available and if it can find any, will proceed to block 112 and offer the call to one of these agents. Such a secondary responsibility might be in the form of block 78 in FIG. 3. If no agent is found in any of these four checks of 98, 102, 106 and 110, the program will go to a block 114 to set a delay time-out. It waits the delay in a circle 116 and if an agent marks himself as available within the delay period, the program will proceed either to a block 118 or a block 120. In either case, the call is marked as offered in both queues such as 68 and 70 in FIG. 3, and the call is offered to the specific agent indicated by either block 122 or 124 as shown. If the delay time is exceeded for circle 116, the program continues to the etc. block 126 to expand the number of queues or submit the call to an operator who may take the customer's number and tell them that someone will call back or some further action.

FIG. 5 illustrates a bounce diagram for the situation of an agent becoming available and then a call becoming available. In other words, in any of the checks of 98, 102, 106 or 110 of FIG. 4, when the queue is checked, an agent is already assumed to be available. As shown as the top of FIG. 4, there are five state machines or devices with the first one being VEC for vector, the second being AGG:1 for agent group group handler 1, the third is agent group group handler 2, and the fourth is agent device handler, while the fifth is a subroutine in a sense of the agent device handler and is AAC for accept application capability. The situation presented in conjunction with FIG. 5 is that an agent belonging to primary group 1 (the second column) and secondary group 2 (the third column), wants to become available. The request queue is first searched to find out if there are any calls waiting to be answered. As indicated, in the initial assumptions, no calls are waiting to be answered. Thus, the ADH for the agent will send an LGQ_QUEUE_PRI_AGENT to the agent group group handler for the agent's primary group and a similar signal entitled, "LGH_QUEUE_SEC_AGENT" to the AGG(2) for the agent's secondary group. At some time later, an application call becomes available (i.e., the call is received and placed in a call queue). The vector wants to queue the call to its groups 2 and 1 (in that order). At this time, the available queues will be searched for agents such as in block 98 of FIG. 4. Since the request is specified as 2, 1, the available queues will be searched in the following order: Primary queue for group 2, primary queue for group 1, secondary queue for group 2, and finally, the secondary queue for group 1. In this case, an available agent will be found when the primary queue for group 1 is searched. A signal designated as 140 and further labeled as LGH_QUEUE_CALL_AND_OFFER event will be sent to the logical group handler for group 1. The agent group handler will mark the call as offered, and the agent device handler for the agent will be sent a signal designated as 142 and further designated as LDH_OFFER_APPL_CALL event. At this time, the agent device handler will send the appropriate events (signals 144 and 146 to agent logical group handlers 1 and 2, respectively). The agent device handler will activate the accept application capability via a signal labeled as 148. The accept application capability state device will request call information from the vector with the signal designated as 150 and labeled VEC_INQUIRE_CALL_INFO and when it is received as shown by signal 152, the zip and flash will be presented. "Zip and flash" is a term of art indicating a burst of dial tone and a flash of information on a console display for the agent. The vector will also send a signal designated as 154 to the agent group handler for group 2 to simply queue the call in case the agent who was offered the call releases it. After the call has been connected by the accept application capability as shown by signal 156 back to the vector, the vector will send a request shown as signals 158 and 160 to the agent group group handlers 2 and 1. This shows that the call that was queued is now being dequeued whether answered by that agent group or a different agent group.

FIG. 6 illustrates a situation handled by the system with the same state machines as illustrated in FIG. 5 when a call becomes available and subsequent thereto an agent becomes available. Thus, the call arrives and the vector indicates this to each of the agent group handlers, as shown by signals 175 and 177, that there is a call queued to be responded to. It is assumed, as shown in the bounce diagram, that an agent in group 1 becomes available and the agent belongs to secondary group 2. When the call first comes in and supplies the signals 175 and 177, the system will perform the checks shown in FIG. 4 as 98, 102, 106 and 110 without success and will go to the wait delay 116. At this time, the agent becomes available and the signal designated as 179 will be forwarded to agent group group handler 1. The state sequencer will mark the call as offered in all the queues designated such as shown in connection with block 118 of FIG. 4 and send the signal 181 back to the agent group handler when the request queue is checked and it is determined that a call is queued to agent group 1. Once the call has been connected by the accept application capability state machine in response to signal 183, the same actions as shown from signal 150 and on in FIG. 5 occur. In other words, the call info is requested from the vector, the call info is returned, the vector call is answered, the call is connected, and the calls are dequeued.

FIG. 7 illustrates a third situation where a call is offered to an agent and the agent decides to release a call that has been offered to the agent rather than take the call. FIG. 7 shows two additional state machines as compared to previous FIGS. 5 and 6. There is first an agent group handler having a primary group 1 and a secondary group 2 and a second agent group handler having a primary group 2 and a secondary group 1. Further, there is an accept application capability for party 1 and an accept application capability for party 2. As shown in FIG. 7, an agent in group 1 becomes available and the agent belongs to secondary group 2. The agent group handler checks the call queue and finds a call queued to agent group 1 and a signal designated as 200 is sent to the agent group group handler 1. The call is offered by the agent logical group handler for group 1 and is queued to groups 1 and 2. An offer is made via signal 202 to the agent device handler 1:2. Signals 204 and 206 are used to dequeue that agent from the agent group queues as both a primary and secondary agent and the accept application capability signal 208 is sent to party 1. Call information is requested from the vector by signal 210 and it is returned by signal 212. The zip and flash are presented to the agent and the agent, for whatever reason and even though not connected to another caller, decides that he can't or doesn't want to take the call and he presses a release button. The release button results in signal 214 being sent to the accept application capability subroutine which then responds with signal 216 to the vector and a release acknowledgement signal 218 to the agent group handler. The groups that the call is queued to will then be checked for additional available agents and it may be found that group 2 has an agent available. The remaining signals in FIG. 7 correspond very much to those starting with signal 150 in FIG. 5 for the situation where the agent does respond and the call is connected rather than being released as was presented in the scenario in the upper portion of FIG. 7.

Referring to FIGS. 8A and 8B, there will be seen, a pair of telephones 220 and 222 connected to a public network designated as 224. The network is connected via a plurality of T1 spans such as 226 to a dash line box 228. The box 228 comprises the heart of the switching system of the present invention. Within box 228 are a plurality of interface cards such as DPT port card 230. Card 230 is connected to a switching network and termination control box 232. A plurality of ISDN basic rate line cards such as 234 and 236 connect to the switching network box 232 as interfaces between box 232 and various consoles for agents and/or supervisors. Each of the agent/supervisor consoles such as 238, 240, 242, 244, 246 and 248 are connected by two B plus one D lines. These lines are capable of one 16 bit D channel and two 64 bit B channels as detailed on the connection between card 236 and console 248. Each of the consoles can be an agent or supervisor console depending upon who logs in on the console and its role as assigned by switching network 232 upon communication of the log-in information.

FIG. 9 provides a possible scenario for an expanding universe of agents where a call comes in and an announcement such as "thank you for calling Sam's car repair, our wonderful mechanic will handle your call as soon as possible" might be announcement number 1. The call would be queued to agent group 1 and there would be a delay of 15 seconds. If the call was not connected to an agent in group 1 at the end of 15 seconds, a second announcement such as announcement 26 which might say "I am sorry, Sam is all tied up at the moment. Please hang on." A delay of 30 seconds might occur and an announcement 574 might be played such as "I am very sorry, Sam is still tied up. Please hang on." At this time, agent group 2 might be queued to add that number of agents to the number in group 1 with the associated checking of primary and secondary responsibility agents and then, if no agents are found available in the new group, the delay of step 8 of 45 seconds may occur. Between step 8 and the final step of the vector listed as 15, more agents could be added and more announcements could be provided to keep on expanding the number of agents that might potentially be available until the call is answered either by one of the agents in the previously assigned group segments or an agent that is found in a newly assigned segment of the group.

OPERATION

From the preceding material, it should be obvious that the present invention involves a caller on a telephone 220 as shown in FIGS. 8A and 8B dialing a given number and being patched through on a public network such as 224 to the switching system within 228. If an agent, with primary responsibility for the subject matter involved with that telephone number, is available, the switching system 232 will check the queue for agents of that responsibility and will offer call to that agent. When the agent accepts the call, the call is connected. This is the simple situation and when many calls are coming from customers all dialing the same number, the number of available agents for that specific call can quickly be depleted to zero. The present invention attempts to address the problem by having three queues, one being a queue of incoming calls, a second queue being a list of agents having primary responsibility for that type of call, and the third queue being a list of agents having secondary responsibility for that type of call. The system is further enhanced by the capability of programming or vector routines which can add additional groups of agents when the system detects that incoming calls are being required to wait more than a predetermined amount of time before being connected to an agent. This is referred to as an expanding universe technique. The expansion segments of a group of agents may not be as conversant with the subject matter. However, the theory behind the present concept is that it is better to answer a call quickly by someone who is not as conversant with the subject as the primary responsibility agents rather than require a customer to wait for the most competent agent to become available. The programs can be written in such a manner that the system can check the queues of various alternate groups and select an alternate group with the shortest call queue to be added to the expanding universe of agents utilized to accept a given type of incoming call.

Referring to FIG. 3, it might be that the English gold card is involved in some kind of TV special whereas the Ginzu knives and vegematic specialty agents have nothing to do. As discussed previously, in connection with FIG. 3 and FIG. 4, incoming calls for the English gold card can initially check the queues of 68 and 70 for two agent groups and check the queues of primary responsibility agents for these two queues. If none are found idle, they can then check the secondary responsibility agents for these two queues. If none are still found available after a predetermined time, the system could expand the universe to the agent group 64 via queue 62 if desired. While this is not shown in the program of FIG. 4, it does fall within the concept of the invention as partially outlined in connection with FIG. 9.

As may be realized, the vector programs only take care of defining the groups of agents that are to be included at a given point in time after a given type of incoming call is placed in the call queue, and it is found that there are no agents presently available to offer the call to. The bounce diagram of FIG. 5 illustrates the situation between the various state machines in sending messages back and forth when an agent becomes available and a call is received according to the flow diagram of FIG. 4. FIG. 6, on the other hand, illustrates the altered steps that occur in passing signals between various state machines when an agent is not immediately available at the time a call is received. It should be realized that the system cannot immediately connect an agent upon completion of a call since sometimes an agent may need to do paperwork or attend to other items between calls. Thus, an agent's console such as console 248 has a button that can be punched when the agent is available to receive or be offered further calls. Also, it has a release button and a display as alluded to previously. When a call is offered to an agent, information appears on the display telling what type of call is incoming. Using the examples presented in FIG. 3, an agent in group 66 might conceivably be offered a Ginzu knife call. It may be, however, that he knows there will be a great many English gold card calls on that specific day and his supervisor has told him to ignore Ginzu knife calls temporarily. If he is offered such a call on Ginzu knives, a release button can be activated and the events shown in FIG. 7 would occur to offer the call to someone else on either the primary or secondary agent queue.

As also alluded to previously, the software can contain provisions for expanding the agent groups available to take a certain type of call where the number of agent groups increases with the delay time between receipt of a call and offering of a call to an agent. This is covered in part in the partial program of FIG. 9 and is limited only by the software commands and functions available to the programmable entity. The expansion of agent groups may be not only strictly on a time basis but can also monitor and take into account potential additional agent groups and their specific workloads at that moment in time.

The prior art in the form of FIG. 1, recognizes the possibility of having primary and secondary responsibility agent groups as a single dimension of routing. Also, the prior art showed a single dimension of routing in the form of offering calls to multiple agent groups. The present invention is the first known instance of offering calls not only to primary and secondary agents, but also to different agent groups either initially or on an expanding basis. Although in hindsight, such a two dimensional routing configuration may seem obvious, the solution in terms of programming and structure required considerable design effort. The solution is obtained in the present invention by having not only a call queue but primary and secondary agent group queues where the primary and secondary agent group queues can be expanded in accordance with a vector program that can be defined by a supervisor at one of the agent/supervisor consoles such as 248. As designed, the system in one embodiment of the invention allowed up to four different agent group queues for a given application such as application 54 in FIG. 3 where only two queues are presently shown.

While I have shown one embodiment of the inventive concept along with an expansion enhancement, I wish to be limited not by the specific approach to quickly answering calls in an automatic call directing switch system promptly due to enhanced call routing techniques, but only by the scope of the appended claims wherein:

I claim:

1. The method of directing incoming calls, received by a call directing switching system that is handling a plurality of applications where a given first application is normally handled by an agent in a given first group of agents trained to handle said first application, to an agent in another group of agents when all agents in said given first group are unavailable at the time of receipt of the call comprising the steps of:
   a. receiving a call;
   b. placing the call in at least first and second queues;
   c. checking a primary service (first choice) group of agents in said first queue to see if any primary service group agents are available and, IF an agent is found to be available, proceeding to step (f);
   d. checking a further primary service (second choice) group of agents in said first queue to see if any primary service group agents are available and, IF an agent is found to be available, proceeding to step (f);
   e. checking a secondary service (third choice) group of agents in said first queue to see if any secondary service group agents are available;
   f. marking the call as being offered to an agent IF an agent is found to be available in one of steps (c) through (e) OTHERWISE;
   g. leaving the call in the queues until offered to and connected with an agent OR a delay timeout is exceeded for an agent becoming available.

2. A method for directing incoming calls to an agent in a group of lower choice agents when all agents in a preferred first group are unavailable at the time of receipt of the call comprising the steps of:
   a. receiving a call;
   b. placing the call received by said receiving step in at least first and second queues;
   c. checking a (first choice) primary service group of agents in said first queue to see if any primary service group agents are available and, IF an agent is found to be available, proceeding to the steps accomplished by step (f);
   d. checking a (second choice) primary service group of agents in said second queue to see if any primary service group agents are available and, IF an agent is found to be available, for proceeding to the steps accomplished by step (f);
   e. checking a (third choice) secondary service group of agents in said first queue to see if any secondary service group agents are available and, IF an agent is found to be available, for proceeding to the steps accomplished by step (f);
   f. marking the call as being offered to an agent IF an agent is found to be available via the actions of one of the steps (c) through (e); and
   g. leaving the call in the queues until offered to and connected with an agent IF the call is not marked as offered by step (f).

3. Apparatus for directing a given type of incoming call to an available agent, logged into an agent terminal, categorized as belonging in one of at least first and second groups of agents where it is more desirable for said given type calls to be taken by a less qualified agent of said second group than to make the caller wait until a more qualified agent of said first group is available comprising, in combination:
   receiving means for receiving calls of a given type;
   primary queuing means for placing a received call of said given type in a primary queue;
   secondary queuing means for placing a received call of said given type in a secondary queue;
   first primary service agent terminal means for providing primary quality responses to incoming calls of said given type connected to said primary queueing means;
   expanded primary service agent terminal means, connected to said secondary queueing means, for providing primary quality responses to incoming calls of said given type when said first primary service agent terminal means is marked as busy upon receipt of said call of said given type;
   secondary service agent terminal means, connected to said primary queueing means, for providing secondary quality responses to incoming calls of said given type when all of said primary service agent terminal means are marked as busy upon receipt of said call of said given type; and
   logic means, interacting with said primary and secondary queueing means, for directing an incoming call of said given type to an available agent terminal means, of said first primary sevice agent terminal means, said expanded primary sevice agent terminal means, and said secondary sevice agent terminal means, when all of said terminal means are marked as busy at the time a call of said given type is first received.

* * * * *